Inventor: Hubert Rothert
BY Spencer & Kaye
Attorneys

United States Patent Office 3,541,410
Patented Nov. 17, 1970

3,541,410
EXCITATION APPARATUS FOR SYNCHRONOUS ROTATING MACHINERY
Hubert Rothert, Berlin, Germany, assignor to Licentia Patent-Verwaltungs G.m.b.H., Frankfurt am Main, Germany
Filed Jan. 2, 1968, Ser. No. 695,258
Claims priority, application Germany, Jan. 2, 1967, L 55,411
Int. Cl. H02p 1/46
U.S. Cl. 318—174                    4 Claims

ABSTRACT OF THE DISCLOSURE

Apparatus for providing excitation for synchronous rotating electrical machinery. The apparatus includes the synchronous rotating machine itself and an exciter rotating machine, each of which has stationary power and field windings and a heteropolar claw-poled rotor. The output or power windings of the exciter machine are electrically coupled to the excitation or field windings of the synchronous machine, for example, by means of controllable rectifiers.

BACKGROUND OF THE INVENTION

The present invention relates to synchronous electric rotating machinery; in particular, to apparatus for providing the excitation of synchronous machinery without the use of brushes.

Various types of excitation apparatus for providing direct current to rotor mounted field windings of electrical machinery are known in the art. One such type of apparatus, which has found increasing use in the rotating electrical machinery art, supplies the rotating field windings of a synchronous machine from likewise rotating output windings of a rotating exciter machine. By arranging these rotating fields and output windings on a common shaft and coupling them with rectifiers which likewise rotate with the shaft, it has been possible to eliminate the slip rings and brushes which would otherwise be necessary to transfer the high excitation currents to the field windings of the synchronous machine.

This type of apparatus has the disadvantage, however, of a limited, relatively slow, regulating action, since the regulation is dependent on the time constants of the machines, especially those of the exciter machine. This drawback can be remedied by inserting controlled rectifiers between the output windings of the exciter machine and the field windings of the synchronous machine; however, it would then again be necessary to provide slip rings and brushes or inductive coupling means to transmit control signals to the rotating rectifiers. Although such slip rings and brushes, for example, may have considerably smaller dimensions than slip rings and brushes designed to handle the excitation current itself, such additional control signal transmission means does effect a considerable increase in the cost of the machinery. This is especially true in the case of larger machines which require a large number of rectifier units.

If, for the excitation and the de-excitation of the synchronous machine, it is necessary to provide reverse excitation current, it has been common practice to divide a number of controllable rectifier elements into two groups: one group providing the excitation and the other the reverse excitation current. The addition of means effecting the transmission of the rectifier control signals from the stationary to the rotating members of this type of plant necessitates an even greater expense.

SUMMARY OF THE INVENTION

An object of the present invention, therefore, is to provide apparatus for the excitation of synchronous rotating machinery which requires no brushes, yet which avoids the disadvantages of the prior art apparatus noted above.

This, as well as other objects which will become apparent in the discussion that follows, are achieved, according to the present invention, by providing a synchronous as well as an exciter rotating machine with stationary excitation and power windings, and with a heteropolar claw-pole rotor. This arrangement permits the power windings of the exciter machine to be electrically coupled with the excitation windings of the synchronous machine by stationary, that is, nonrotating controllable rectifiers. Control wires may then be connected rirectly to the rectifiers without the use of intermediate brushes.

DESCRIPTION OF THE PREFERRED EMBODIMENT

Figure 1:
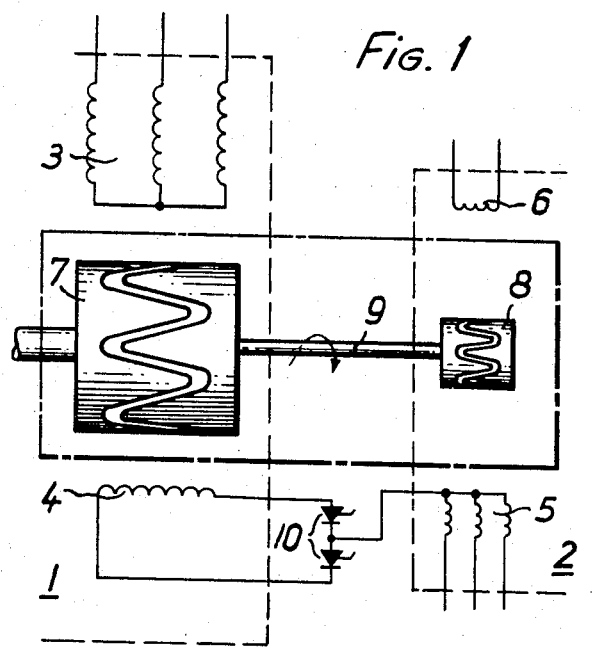
FIG. 1 is a schematic diagram of a claw-pole stationary-field synchronous machine employing exciter apparatus according to the preferred embodiment of the present invention.

Referring now to the drawing, FIG. 1 illustrates a synchronous machine together with its exciter apparatus according to the preferred embodiment of the present invention. The figure shows a main synchronous machine 1 having a power winding 3 and an excitation winding 4 and an auxiliary exciter machine 2 having a power or output winding 5 and an excitation winding 6. The necessary changing of the magnetic flux, excited by the winding 4 of the main machine 1 is achieved by means of the heteropolar claw-pole rotor 7; the changing of the magnetic flux, excited by the winding 6 of the auxiliary machine is likewise achieved by means of the heteropolar claw-pole rotor 8. These two claw-pole rotors 7 and 8, which may, if desired, be joined by a shaft 9, are the only rotating members in the entire arrangement. All the other parts of the main and auxiliary machines are stationary, including the rectifiers 10 which serve to rectify the alternating current produced at the power winding 5 of the exciter machine 2.

Since rotating machinery of the type having stationary field windings and a claw-pole rotor are known in the art, they will not be described in detail here. Further information concerning the design of such machines may be obtained, however, by referring to U.S. Pat. No. 2,928,963, issued Mar. 15, 1960, or to U.S.S.R. Pat. 147,657, published in Soviet Inventions Illustrated, edited in London, October 1962.

Figure 2:
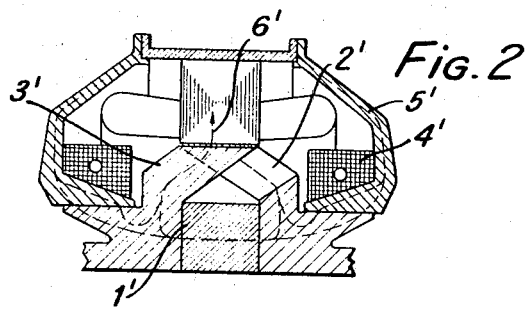
FIG. 2 is a schematic showing of a prior art device having stationary windings.

The latter publication sets out a no contact synchronous electrical machine with reduced weight. The proposed synchronous machine differs from those known in that the excitation windings are made fixed (located on the pole projections) while the external magnetic circuit and stator are located in the magnetic circuit of the machine parallel to the permanent magnet. This magnet is oriented in the direction in which the difference between the magnet and excitation winding magnetic fluxes pass through the external magnetic circuit. As shown in FIG. 2, permanent magnet 1' is housed in the central part of a rotor with claw-shaped poles, between pole systems 2 and 3. Additional excitation winding 4' for regulating the flux is located on the polar projection of synchronous machine external magnet circuit 5', and, in consequence, the machine is a no contact machine. The external magnetic circuit 5', and the main magnetic circuit 6' (pole-gap-stator-gap-pole) are connected in parallel to a permanent magnet, oriented in the direction through which the difference between the magnetic fluxes of permanent magnet 1' and excitation winding 4' pass through external magnetic circuit 5'. In the main circuit, these fluxes point the same way. When the magnetic fluxes are directed in this way, it is possible to construct a machine which has a reduced magnetic circuit section, and consequently with a reduced weight.

It will be seen that the excitation apparatus, according to the present invention, thus makes it possible to simply and instantaneously control the current fed to the excitation winding 4 of the main machine through direct control of the rectifiers 10. This apparatus requires neither auxiliary slip rings and brushes nor induction coils to feed the control signal to the rectifiers 10. The control signal can, rather, be transmitted to the rectifiers by means of a permanent and stationary galvanic connection. Not only is such a connection less expensice to produce, but it is also considerably more reliable than the inductive connection or the connection through the slip rings and brushes which was required in the prior art.

Since the claw-pole rotors 7 and 8 can be constructed with any desired degree of sturdiness, and since all the members of the machine which are particularly susceptible to breakdown are here made stationary, the apparatus, according to the present invention, exhibits a considerable improvement in reliability over the apparatus known in the prior art.

It will be understood that the above description of the present invention is susceptible to various modifications, changes, and adaptations, and the same are intended to be comprehended within the meaning and range of equivalents of the appended claims.

I claim:
1. Electric rotating machinery comprising, in combination:
    (a) a synchronous machine having stationary excitation and power windings and a heteropolar claw-pole rotor;
    (b) an exciter machine having stationary excitation and power windings and a heteropolar claw-pole rotor; and
    (c) means for electrically coupling said power windings of said exciter machine with said excitation windings of said synchronous machine.
2. Electric rotating machinery as defined in claim 1, further comprising means for mechanically coupling said rotor of said exciter machine with said rotor of said synchronous machine.
3. Electric rotating machinery as defined in claim 1, wherein said coupling means include at least one stationary rectifier.
4. Electric rotating machinery as defined in claim 3, wherein said at least one rectifier is a controllable rectifier.

References Cited
UNITED STATES PATENTS

| | | | |
|---|---|---|---|
| 2,928,963 | 3/1960 | Bertsche et al. | 310—168 |
| 3,098,959 | 7/1963 | Rosenberry | 318—181 |
| 3,100,279 | 8/1963 | Rohner | 318—193 XR |
| 3,184,625 | 5/1965 | Farison | 310—263 XR |
| 3,293,518 | 12/1966 | Nevmann | 318—193 XR |
| 3,319,100 | 5/1967 | Erickson | 310—263 XR |

ORIS L. RADER, Primary Examiner

G. Z. RUBINSON, Assistant Examiner

U.S. Cl. X.R.

318—176, 181, 183, 193; 310—263